(12) United States Patent
Nagashima (10) Patent No.: US 7,283,434 B2
(45) Date of Patent: Oct. 16, 2007

(54) OPTICAL PICKUP DEVICE CAPABLE OF CORRECTING SPHERICAL ABERRATION

(75) Inventor: Kenji Nagashima, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 485 days.

(21) Appl. No.: 11/026,490

(22) Filed: Dec. 30, 2004

(65) Prior Publication Data
US 2005/0152237 A1    Jul. 14, 2005

(30) Foreign Application Priority Data
Jan. 5, 2004    (JP)    ............................. 2004-000554

(51) Int. Cl.
*G11B 7/00* (2006.01)
(52) U.S. Cl. .............................. 369/44.21; 369/44.14; 369/112.01; 369/119
(58) Field of Classification Search ...................... None
See application file for complete search history.

(56) References Cited

U.S. PATENT DOCUMENTS 4,344,164 A * 8/1982 Bricot et al. ............. 369/44.14
4,761,774 A * 8/1988 Ishibashi et al. .......... 369/44.19
2001/0028625 A1 * 10/2001 Asada et al. ............. 369/112.24

FOREIGN PATENT DOCUMENTS

JP    2003-141771 A    5/2003

OTHER PUBLICATIONS

Patent Abstracts of Japan publication No. 2003-141771, published on May 16, 2003 (1 page).

* cited by examiner

*Primary Examiner*—Muhammad Edun
(74) *Attorney, Agent, or Firm*—Osha Liang LLP (57) ABSTRACT

A mirror actuator includes a piezoelectric element having a thickness in a direction perpendicular to a surface of the mirror, and a circular surface bonded to a circular rear surface of the mirror such that the center of the circular surface of the piezoelectric element and that of the circular rear surface of the mirror match. The piezoelectric element receives a potential to cause the circular surface bonded to the mirror to expand/contract radially around 360 degrees by a uniform ratio to allow the mirror to have a surface modified in geometry. The piezoelectric element is adjusted in thickness so that as the piezoelectric element expands/contracts, the piezoelectric element allows the mirror to have a surface with a ratio of a radius of curvature in a radial direction of the mirror to that of curvature in a tangential direction of the mirror of $(\cos(2\theta)+1)/2$, where $\theta$ represents an angle of incidence on the surface of the mirror.

4 Claims, 10 Drawing Sheets

| THICKNESS OF MATERIAL OF DISK | AMOUNT OF SPHERICAL ABERRATION UNCORRECTED | RADIUS OF CURVATURE AS MODIFIED FOR CORRECTION | | AMOUNT OF SPHERICAL ABERRATION CORRECTED |
|---|---|---|---|---|
| | | (TANGENTIAL DIRECTION) | (RADIAL DIRECTION) | |
| [mm] | [m$\lambda$] | [mm] | [mm] | [m$\lambda$] |
| 0.050 | 78.4 | 4300 | 2150 | 0.2 |
| 0.075 | 39.2 | | | 0.0 |
| 0.100 | 0.1 | 0 | 0 | 0.1 |
| 0.125 | −38.8 | | | 0.0 |
| 0.150 | −77.5 | −4200 | −2100 | 1.2 |
| 0.175 | −116.2 | | | 0.0 |
| 0.200 | −154.6 | −2100 | −1050 | 1.5 |
| 0.225 | −193.0 | | | 0.0 |
| 0.250 | −231.2 | −1400 | −700 | 1.0 |

Hmax=6.4um
(at r=3.0mm)

| MIRROR ANGLE | RADIUS OF CURVATURE | | RATIO |
| --- | --- | --- | --- |
| | TANGENTIAL DIRECTION | RADIAL DIRECTION | |
| 0 | | | 1.00000 |
| 15 | 3151 | 2940 | 0.93302 |
| 30 | 3520 | 2640 | 0.75000 |
| 45 | 4300 | 2150 | 0.50000 |
| 60 | 6060 | 1515 | 0.25000 |
| 75 | 11749 | 787 | 0.06698 |
| 90 | | | 0 |

OPTICAL PICKUP DEVICE CAPABLE OF CORRECTING SPHERICAL ABERRATION

BACKGROUND OF THE INVENTION

1. Field of the Invention

The present invention relates generally to optical pickup devices and particularly to optical pickup devices having a function correcting spherical aberration.

2. Description of the Background Art

Compact disks (CDs), digital versatile disks (DVD) and other similar optical disks have their stored information reproduced via apparatuses including an optical pickup device to optically read the information from the optical disks.

In an optical pickup device a source of light emits a laser beam of light which is in turn reflected by a mirror and gathered by an objective lens to illuminate an optical disk's recording surface on a desired track. The track reflects and thus returns the light which is in turn detected by a photodetector to read the track's information.

The light gathered by the objective lens can provide spherical aberration. Spherical aberration means that, of rays focused by the objective lens, a ray passing through a portion of the lens remote from the optical axis, or the lens's peripheral portion, and a ray passing close to the optical axis, or the lens's center, are focused at different locations. When spherical aberration is introduced, an optical disk cannot have its information satisfactorily reproduced.

Accordingly, the objective lens is designed to correct spherical aberration for a thickness of an optical disk predetermined. If the optical disk is not uniform in thickness, however, and an amount of correction does not match, spherical aberration is introduced. Furthermore, if the optical disk has a recording layer formed of multiple layers, and a jump is made to a different layer, an amount of correction does not match, and spherical aberration is introduced.

Such spherical aberration is prevented for example by a method employing a liquid crystal device to modulate a phase corresponding to the spherical aberration, as disclosed in Japanese Patent Laying-Open No. 2003-141771.

Using a liquid crystal device to provide phase modulation as described in the publication, however, requires an optical pickup device to have a complicated structure and also contributes to increased cost.

SUMMARY OF THE INVENTION

The present invention contemplates an optical pickup device that can have a simplified structure to reduce spherical aberration.

To overcome the above disadvantage, the present invention in one aspect provides an optical pickup device allowing a laser beam of light emitted from a source of a laser beam of light to be reflected by a mirror to provide a reflection of light which is in turn focused by an objective lens on an optical storage medium, the optical pickup device including: a circular mirror reflecting the laser beam of light; and a mirror actuator including a piezoelectric element having a thickness in a direction perpendicular to a surface of the mirror, and a circular surface bonded to a circular rear surface of the mirror such that the center of the circular surface of the piezoelectric element and that of the circular rear surface of the mirror match, the piezoelectric element receiving a potential to cause the circular surface bonded to the mirror to expand/contract radially around 360 degrees by a uniform ratio to allow the mirror to have a surface modified in geometry, the piezoelectric element being adjusted in thickness so that as the piezoelectric element expands/contracts, the piezoelectric element allows the mirror to have a surface with a ratio of a radius of curvature in a radial direction of the mirror to that of curvature in a tangential direction of the mirror of $(\cos(2\theta)+1)/2$, where $\theta$ represents an angle of incidence on the surface of the mirror.

The present invention in another aspect provides an optical pickup device allowing a laser beam of light emitted from a source of a laser beam of light to be reflected by a mirror to provide a reflection of light in turn focused by an objective lens on an optical storage medium, the optical pickup device including: a circular mirror reflecting the laser beam of light; and a mirror actuator including a piezoelectric element having a thickness in a direction perpendicular to a surface of the mirror, and a circular surface bonded to a circular rear surface of the mirror such that the center of the circular surface of the piezoelectric element and that of the circular rear surface of the mirror match, the piezoelectric element receiving a potential to cause the circular surface bonded to the mirror to expand/contract radially around 360 degrees by a uniform ratio to allow the mirror to have a surface modified in geometry, the piezoelectric element varying in thickness in a predetermined number of steps to be thinner toward the center and thicker toward the perimeter to have regions different in thickness each forming with an adjacent region a boundary in the form of an ellipse having longer and shorter axes in radial and tangential directions, respectively, as seen in a plane perpendicular to the mirror's centerline.

Furthermore the present invention in still another aspect provides an optical pickup device allowing a laser beam of light emitted from a source of a laser beam of light to be reflected by a mirror to provide a reflection of light which is in turn focused by an objective lens on an optical storage medium, the optical pickup device including: a circular mirror having a thickness reflecting the laser beam of light; and a mirror actuator including a piezoelectric element having a circular surface bonded to a circular rear surface of the mirror such that the center of the circular surface of the piezoelectric element and that of the circular rear surface of the mirror match, the piezoelectric element receiving a potential to cause the circular surface bonded to the mirror to expand/contract radially around 360 degrees by a uniform ratio to allow the mirror to have a surface modified in geometry, the mirror varying in thickness in a predetermined number of steps to be thinner toward the center and thicker toward the perimeter to have regions different in thickness each forming with an adjacent region a boundary in the form of an ellipse having longer and shorter axes in radial and tangential directions, respectively, as seen in a plane perpendicular to the mirror's centerline.

The present invention in still another aspect provides an optical pickup device allowing a laser beam of light emitted from a source of a laser beam of light to be reflected by a mirror to provide a reflection of light in turn focused by an objective lens on an optical storage medium, the optical pickup device including: a circular mirror reflecting the laser beam of light; and a mirror actuator including a piezoelectric element having a uniform thickness in a direction perpendicular to a surface of the mirror, and an elliptical surface having longer and shorter axes in radial and tangential directions, respectively, and bonded to a circular rear surface of the mirror such that the center of the elliptical surface of the piezoelectric element and that of the circular rear surface of the mirror match, the piezoelectric element receiving a potential to cause the elliptical surface to expand/contract radially around 360 degrees by a uniform ratio to allow the mirror to have a surface modified in geometry.

The present optical pickup device can have a simplified structure to reduce spherical aberration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in embodiments will be described with reference to the drawings.

First Embodiment

The present embodiment relates to an optical pickup device including a mirror actuator having a piezoelectric element with anisotropic thickness to provide a minimized amount of spherical aberration.

Figure 1:
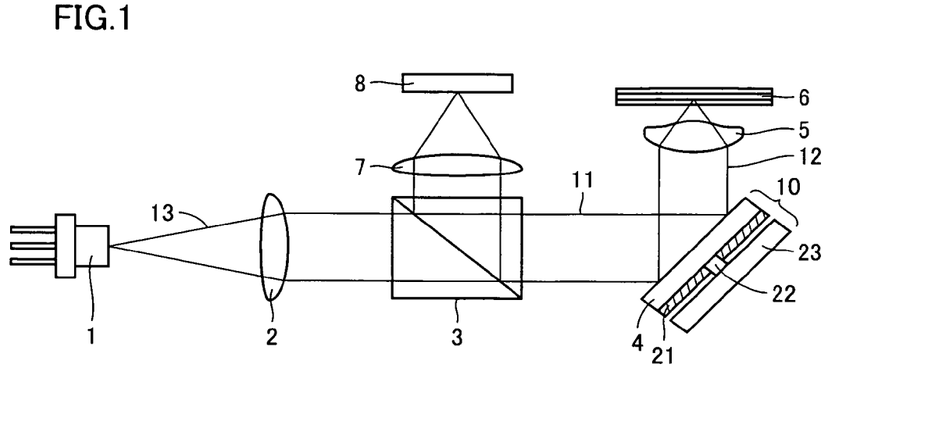
FIG. 1 shows a main portion of an optical system of an optical pickup device.

FIG. 1 shows a main portion of an optical system of the pickup device. With reference to the figure, the optical pickup device includes a source of light 1, a collimator 2, a polarizing beam splitter 3, a circular, turning/aberration correction mirror 4, an objective lens 5, a cylindrical lens 7, a photodetector 8, and a mirror actuator 10.

The source of light 1 emits a beam 13. Collimator 2 collimates beam 13 into a collimated beam of light 11. Mirror 4 turns the collimated beam of light 11 in a direction, i.e., reflects beam 11 toward an optical disk 6 to provide a reflection of light 12. Objective lens 5 allows the reflection of light 12 to illuminate optical disk 6 on an information recording surface.

The information recording surface has a bit train, which modulates the reflection of light in optical intensity. The reflection of light thus modulated then passes through objective lens 5 and is reflected by mirror 4 and then polarizing beam splitter 3 and converged by cylindrical lens 7 and thus input to photodetector 8.

Photodetector 8 receives the light, which is used to reproduce information of optical disk 6 and control objective lens 5 to focus and track appropriately.

Furthermore, a control circuit (not shown) separates the light incident on photodetector 8 into light of a center portion and that of a peripheral portion and detects their respective focus positions to detect an amount of spherical aberration. The control circuit is driven by the detected amount of spherical aberration to control mirror actuator 10, which supports mirror 4, to modify the mirror 4 mirror surface in geometry to reduce the amount of spherical aberration.

Figure 2A:
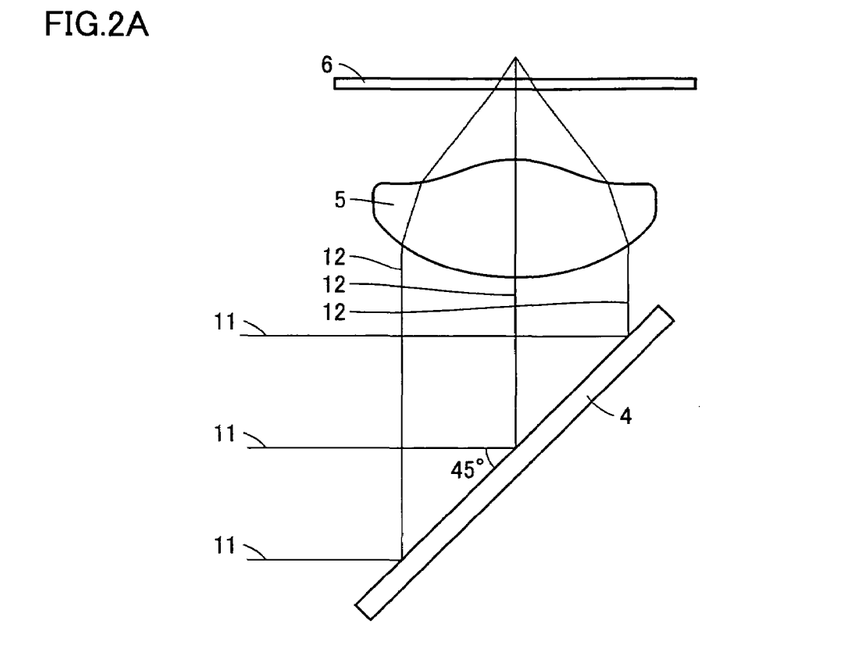
FIG. 2A shows an optical path of a reflection of light 12 provided when a turning/aberration correction mirror 4 has a mirror surface with a typical geometry and FIG. 2B shows an optical path of the reflection of light 12 provided when turning/aberration correction mirror 4 has its mirror surface modified in geometry.

FIG. 2A shows an optical path of the reflection of light 12 provided when mirror 4 has a mirror surface with a typical or flat geometry. As shown in the figure, spherical aberration has been introduced.

Figure 2B:
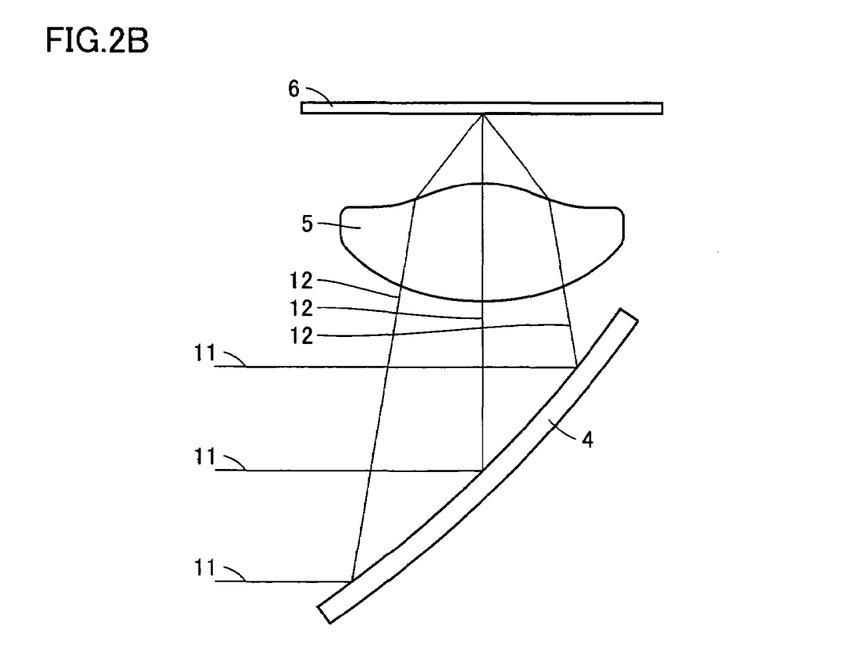

FIG. 2B shows an optical path of the reflection of light 12 provided when mirror 4 has its mirror surface modified in geometry. As shown in the figure, the mirror surface is modified in geometry to reduce an amount of spherical aberration.

Figure 3:
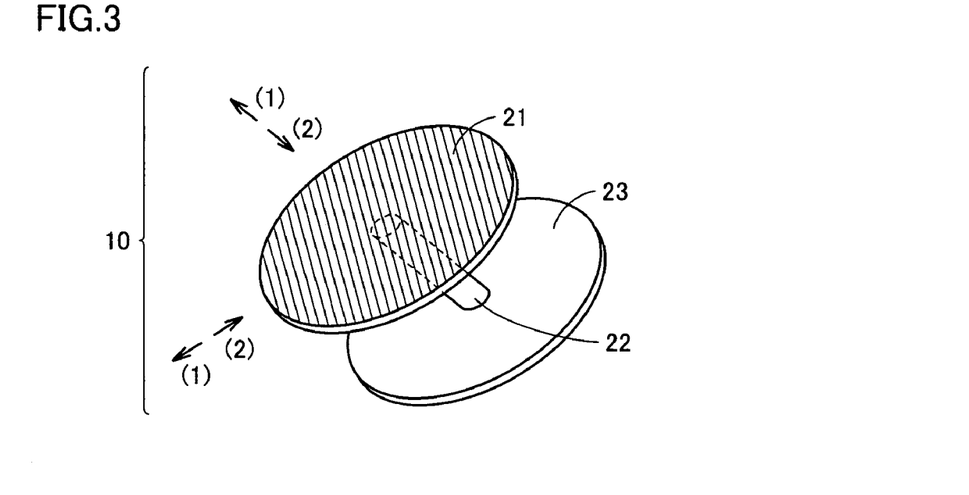
FIG. 3 shows a structure of a mirror actuator 10 in a first embodiment.

FIG. 3 shows a structure of mirror actuator 10. With reference to the figure, mirror actuator 10 includes a piezoelectric element 21, a branch 22 supporting piezoelectric element 21, and a fixture 23.

Piezoelectric element 21 is bonded on a rear surface of mirror 4. The surface of piezoelectric element 21 that is bonded to the rear surface of mirror 4 is a circle, and the circle's center matches that of the rear, circular surface of the mirror. Piezoelectric element 21 has its thickness in a direction perpendicular to the mirror surface.

When piezoelectric element 21 has potential applied thereon, piezoelectric element 21 expands/contracts. More specifically, when piezoelectric element 21 receives positive potential, piezoelectric element 21 has the circular surface bonded to mirror 4 expanding radially around 360 degrees by a uniform ratio, as indicated in FIG. 3 by an arrow (1). As mirror 4 is bonded to piezoelectric element 21, mirror 4 flexes to concave, and the reflection of light 12 is thus converged.

In contrast, when piezoelectric element 21 receives negative potential, then as indicated in FIG. 3 by an arrow (2), piezoelectric element 21 has the circular surface bonded to mirror 4 contracting radially around 360 degrees by a uniform ratio. As mirror 4 is bonded to piezoelectric element 21, mirror 4 flexes to protrude, and the reflection of light 12 is thus diverged.

Figure 4:
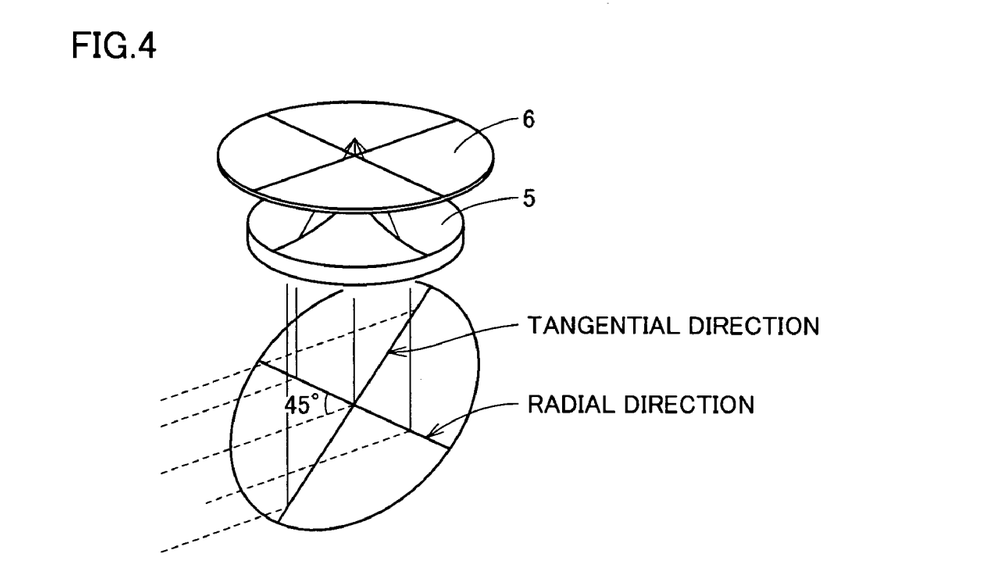
FIG. 4 shows the mirror 4 mirror surface receiving a collimated beam of light 11 in the form of a spot.

As shown in FIG. 4, as a mirror angle of 45° is set, mirror 4 has a mirror surface receiving the collimated beam of light 11 in an elliptical spot. Herein a "mirror angle" refers to an angle of the collimated beam of light 11 incident on the mirror 4 mirror surface having a typical geometry.

In FIG. 4, a tangential direction is a direction parallel to the mirror surface of mirror 4 in normal condition and connecting locations on the mirror that receive rays of light closest to and remotest from the optical disk 6 surface. A radial direction is a direction parallel to the mirror surface of mirror 4 in normal condition and perpendicular to the tangential direction.

Thus if a spot is elliptical, flexing mirror 4 in the tangential and radial directions by equal amounts (i.e., providing a curvature uniform in the tangential and radial directions) does not provide reduced amount of spherical aberration.

Figure 5:
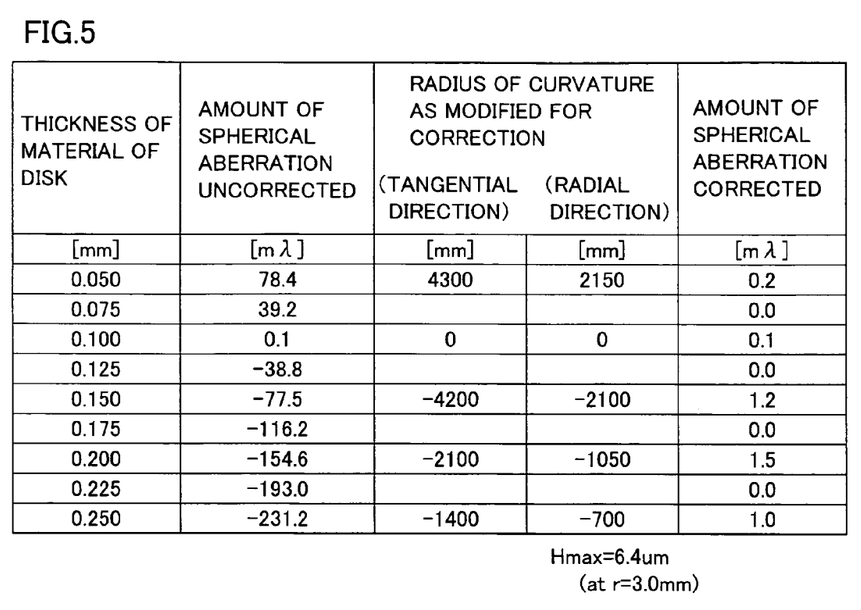
FIG. 5 represents a relationship between a radius of curvature and an amount of spherical aberration.

FIG. 5 represents a relationship between a radius of curvature and an amount of spherical aberration. The figure indicates an uncorrected amount of spherical aberration, radii of curvature in the tangential and radial directions, respectively, as modified for correction, and a corrected amount of spherical aberration for a mirror angle of 45° for each thickness of material for an optical disk. As indicated in the figure, when the radius of curvature in the tangential direction is set to be twice that of curvature in the radial direction, a minimized amount of spherical aberration is provided.

Figure 6A:
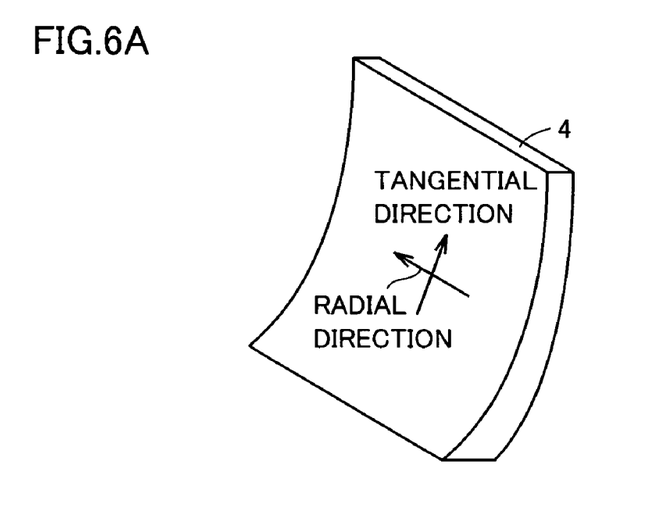
FIG. 6A generally shows a geometry of a mirror surface of mirror 4 and FIGS. 6B and 6C show the same mirror surface's geometry in tangential and radial directions, respectively.
Figure 6B:
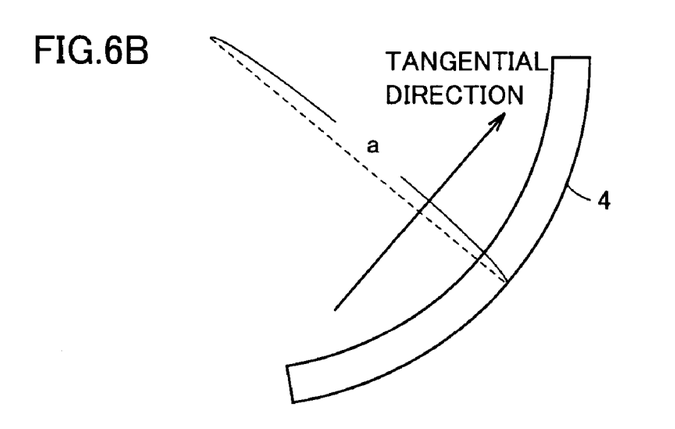
Figure 6C:
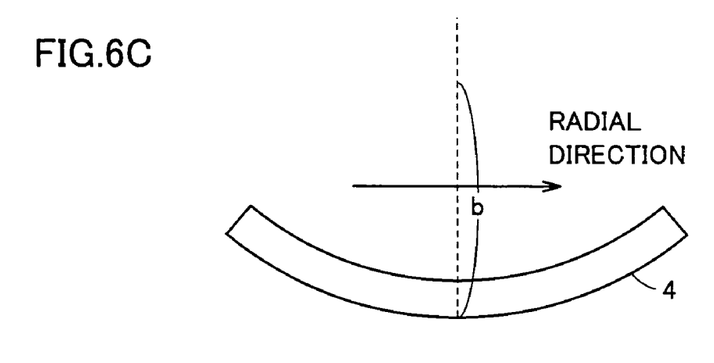

Thus in the present embodiment, as shown in FIGS. 6A-6C, mirror 4 is flexed to set a radius of curvature a in the tangential direction to be twice a radius of curvature b in the radial direction. FIG. 6A generally shows a geometry of a mirror surface of mirror 4 and FIGS. 6B and 6B show the same mirror surface's geometry in the tangential and radial directions, respectively.

Flexing mirror 4 requires changing in geometry piezoelectric element 21 bonded to the rear surface of mirror 4. However, as has been described previously, piezoelectric element 21 expands and contracts radially by a uniform ratio by an mount, as controlled by a single value in potential, and its amount of expansion and contraction cannot be adjusted in the tangential and radial directions separately. Accordingly, piezoelectric element 21 is designed to have thickness in the tangential and radial directions in appropriate amounts, respectively, to allow mirror 4 to have a radius of curvature in the tangential direction twice that of curvature in the radial direction. More specifically, the fact is utilized that when piezoelectric element 21 smaller in thickness expands/contracts, mirror 4 more readily flexes.

It should be noted that a thickness of piezoelectric element 21 and an amount of flexure of mirror 4 have a relationship depending for example on material for piezoelectric element 21. Accordingly, the piezoelectric element 21 thickness in the tangential and radial directions is designed for each individual piezoelectric element used.

In the above description, for a mirror angle of 45° mirror 4 has a radius of curvature in the tangential direction that is twice that of curvature in the radial direction to provide a minimized amount of spherical aberration. Hereinafter a description will be provided for a mirror angle other than 45°.

Figure 7:
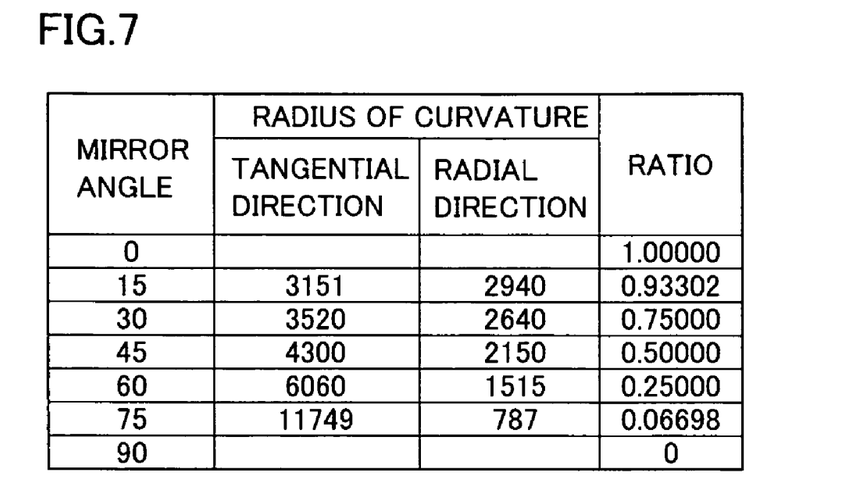
FIG. 7 indicates for each mirror angle a ratio of a radius of curvature in the radial direction to a radius of curvature in the tangential direction that provides a minimum amount of spherical aberration.

FIG. 7 indicates for each mirror angle a ratio of a radius of curvature in the radial direction relative to that of curvature in the tangential direction that provides a minimized amount of spherical aberration. If the figure's relationship is represented in an expression then for a mirror angle $\theta$ a ratio of a radius of curvature in the radial direction relative to that of curvature in the tangential direction will be $(\cos(2\theta)+1)/2$, and such a ratio can be achieved simply by designing piezoelectric element 21 in thickness in the tangential and radial directions so as to correspond to each individual piezoelectric element used.

Thus the present embodiment provides an optical pickup device including piezoelectric element 12 adjusted in thickness in both tangential and radial directions to allow a turning/aberration correction mirror angled by $\theta$ to have a ratio of a radius of curvature in the radial direction to that of curvature in the tangential direction set to be $(\cos(2\theta)+1)/2$. A minimized amount of spherical aberration can thus be achieved.

Second Embodiment

The present embodiment relates to an optical pickup device including a mirror actuator having a piezoelectric element with anisotropic thickness to provide an amount of spherical aberration smaller than conventional.

The first embodiment contemplates a minimized amount of spherical aberration. This requires complicated adjustment of a piezoelectric element in thickness to allow turning/aberration correction mirror 12 to have radii of curvature in tangential and radial directions in an optimal ratio, as shown in FIG. 7.

The present embodiment contemplates providing a simple method to achieve an amount of spherical aberration smaller than conventional.

The present embodiment provides an optical pickup device distinguished from the first embodiment's optical pickup device shown in FIG. 1 by mirror actuator 80 that is structured and operates, as will be described hereinafter.

Figure 8:
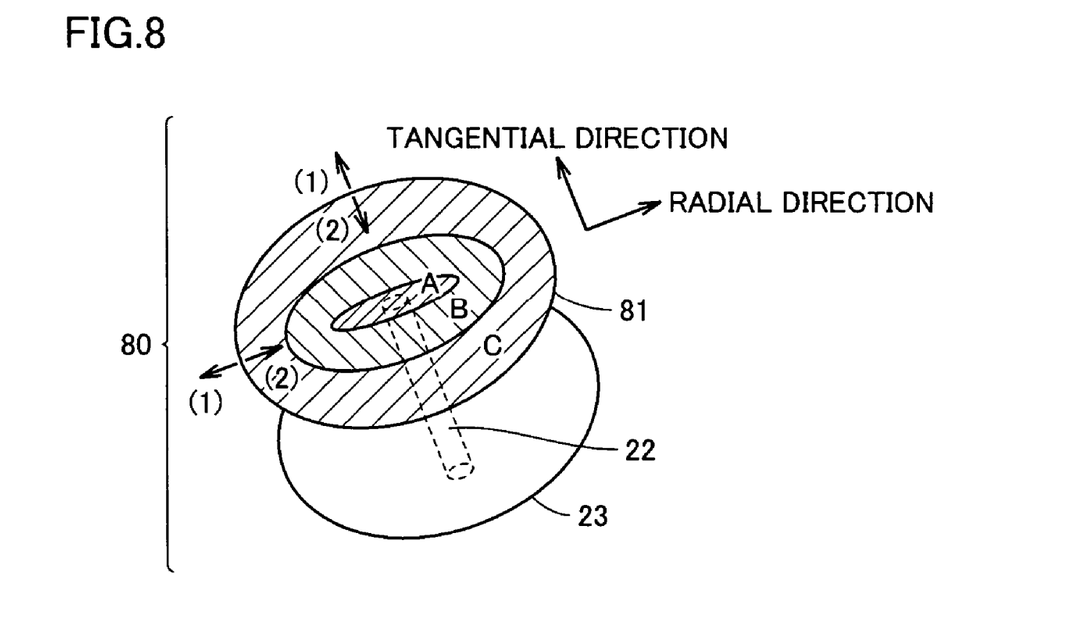
FIG. 8 shows a structure of a mirror actuator 80 in a second embodiment.

FIG. 8 shows a structure of mirror actuator 80 in the present embodiment. With reference to the figure, mirror actuator 80 includes a piezoelectric element 81, a branch 22 supporting piezoelectric element 81, and a fixture 23.

Piezoelectric element 81 is bonded on a rear surface of mirror 4. The surface of piezoelectric element 81 that is bonded to the rear surface of mirror 4 is a circle, and the circle's center matches that of the rear, circular surface of the mirror. Piezoelectric element 81 has its thickness in a direction perpendicular to the mirror surface.

When piezoelectric element 81 has potential applied thereon, piezoelectric element 81 expands/contracts. More specifically, when piezoelectric element 81 receives positive potential, piezoelectric element 81 has the circular surface bonded to mirror 4 expanding radially around 360 degrees by a uniform ratio, as indicated in FIG. 8 by an arrow (1). As mirror 4 is bonded to piezoelectric element 81, mirror 4 flexes to concave, and the reflection of light 12 is thus converged.

In contrast, when piezoelectric element 81 receives negative potential, then as indicated in FIG. 8 by an arrow (2), piezoelectric element 81 has the circular surface bonded to mirror 4 contracting radially around 360 degrees by a uniform ratio. As mirror 4 is bonded to piezoelectric element 81, mirror 4 flexes to protrude, and the reflection of light 12 is thus diverged.

Piezoelectric element 81 becomes smaller in thickness toward the center by varying in three steps, as shown in FIG. 8. More specifically, if the piezoelectric element 81 has a center portion or an area A having a thickness d1, an intermediate portion or an area B having a thickness d2, and a peripheral portion or an area C having a thickness d3, then d1<d2<d3 is established.

In piezoelectric element 81 an area of a thickness and another, adjacent area of a different thickness form a boundary which, as seen in a plane perpendicular to the mirror's centerline, is in the form an ellipse having longer and shorter axes in the radial and tangential directions, respectively. The mirror's centerline indicates a straight line perpendicular to the mirror surface of mirror 4 in normal condition and passing the center of the mirror surface. Thus the center portion or area A and the intermediate portion or area B form a boundary in the form of an ellipse having longer and shorter axes in the radial and tangential directions, respectively, as seen in a plane perpendicular to the mirror's centerline, and so do the intermediate area B and the peripheral area C.

Figure 9A:
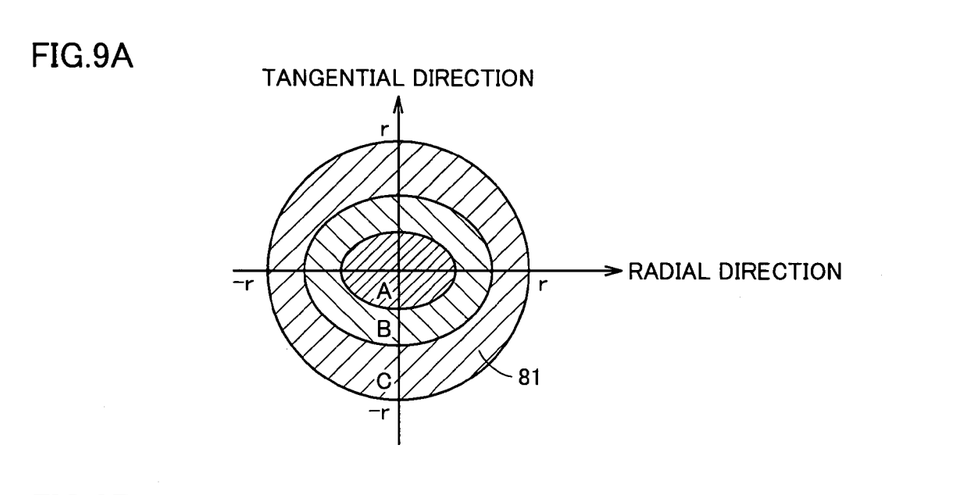
FIG. 9A shows areas A-C as seen in a direction perpendicular to the mirror surface.
Figure 9B:
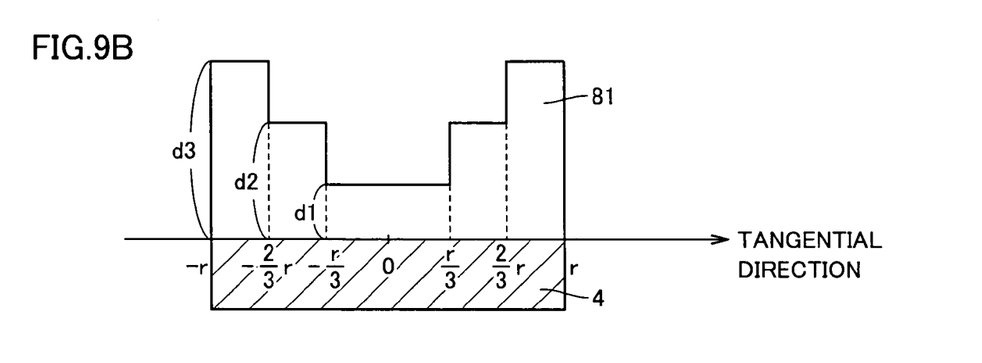
FIGS. 9B and 9C show variations in thickness of a piezoelectric element 81 as seen in the tangential and radial directions, respectively.
Figure 9C:
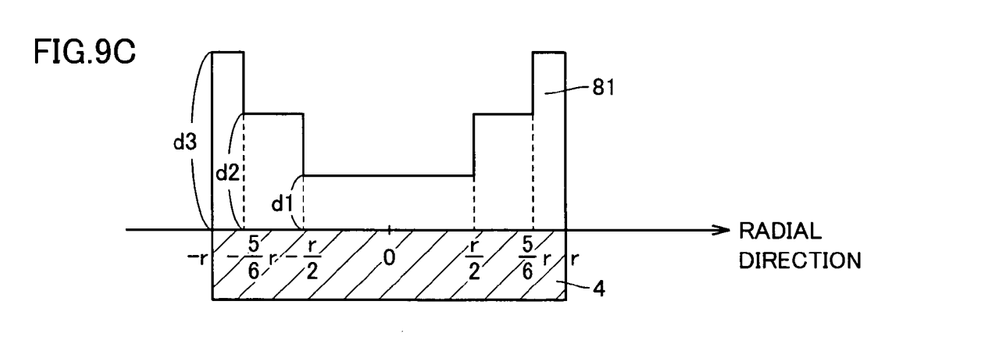

FIG. 9A shows areas A-C as seen in a direction perpendicular to the mirror surface. FIG. 9B and 9C illustrate how in the tangential and radial directions, respectively, piezoelectric element 81 varies in thickness.

As shown in the figures, piezoelectric element 81 at a thin portion has a ratio larger in the radial direction than the tangential direction. As such, turning/aberration correction mirror 4 more readily flexes in the radial direction, and its mirror surface can be deformed to have a radius of curvature in the tangential direction larger than that of curvature in the radial direction. A smaller amount of spherical aberration can be achieved than when radii of curvature in the tangential and radial directions are equal.

Thus the present embodiment provides an optical pickup device that includes piezoelectric element 81 having a thin portion with a ratio larger in the radial direction than the tangential direction to allow turning/aberration correction mirror 4 to have a mirror surface having a geometry with a radius of curvature in the tangential direction larger than that of curvature in the radial direction. A smaller amount of spherical aberration can be achieved that when radii of curvature in the tangential and radial directions are equal.

Third Embodiment

The present embodiment relates to an optical pickup device including a mirror having anisotropic thickness to provide an amount of spherical aberration smaller than conventional.

In the second embodiment, turning/aberration correction mirror 4 is uniform in thickness and piezoelectric element 81 varies in thickness. In the present embodiment, in contrast, a piezoelectric element 71 is uniform in thickness, whereas a turning/aberration correction mirror 74 varies in thickness, similarly as has been described in the second embodiment for piezoelectric element 81.

The present embodiment provides an optical pickup device distinguished from the first embodiment's optical pickup device shown in FIG. 1 by mirror actuator 70 and turning/aberration correction mirror 74 that are structured and operate, as will be described hereinafter.

Figure 10:
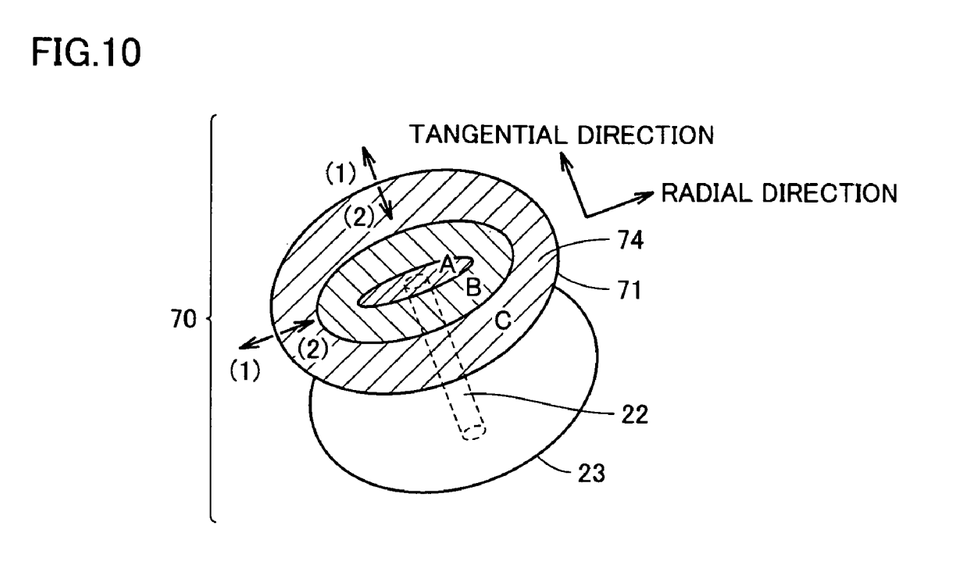
FIG. 10 shows a structure of a mirror actuator 70 and a turning/aberration correction mirror 74.

FIG. 10 shows a structure of mirror actuator 70 and mirror 74 in the present embodiment. With reference to the figure, mirror actuator 70 includes a piezoelectric element 71, branch 22 supporting piezoelectric element 71, and fixture 23.

Piezoelectric element 71 is bonded on a rear surface of mirror 74. The surface of piezoelectric element 71 that is bonded to the rear surface of mirror 74 is a circle, and the circle's center matches that of the rear, circular surface of the mirror. Piezoelectric element 71 has a uniform thickness in a direction perpendicular to the mirror surface.

When piezoelectric element 71 has potential applied thereon, piezoelectric element 71 expands/contracts. More specifically, when piezoelectric element 71 receives positive potential, piezoelectric element 71 has the circular surface bonded to mirror 74 expanding radially around 360 degrees by a uniform ratio, as indicated in FIG. 10 by an arrow (1).

As mirror 74 is bonded to piezoelectric element 71, mirror 74 flexes to concave, and the reflection of light 12 is thus converged.

In contrast, when piezoelectric element 71 receives negative potential, then as indicated in FIG. 10 by an arrow (2), piezoelectric element 71 has the circular surface bonded to mirror 74 contracting radially around 360 degrees by a uniform ratio. As mirror 74 is bonded to piezoelectric element 71, mirror 74 flexes to protrude, and the reflection of light 12 is thus diverged.

Mirror 74 becomes smaller in thickness toward the center by varying in three steps, as shown in FIG. 10. More specifically, if the piezoelectric element 71 has a center portion or an area A having a thickness d1, an intermediate portion or an area B having a thickness d2, and a peripheral portion or an area C having a thickness d3, then d1<d2<d3 is established.

In mirror 74 an area of a thickness and another, adjacent area of a different thickness form a boundary which, as seen in a plane perpendicular to the mirror's centerline, is in the form an ellipse having longer and shorter axes in the radial and tangential directions, respectively. Thus the center portion or area A and the intermediate portion or area B form a boundary in the form of an ellipse having longer and shorter axes in the radial and tangential directions, respectively, as seen in a plane perpendicular to the mirror's centerline, and so do the intermediate area B and the peripheral area C.

Figure 11A:
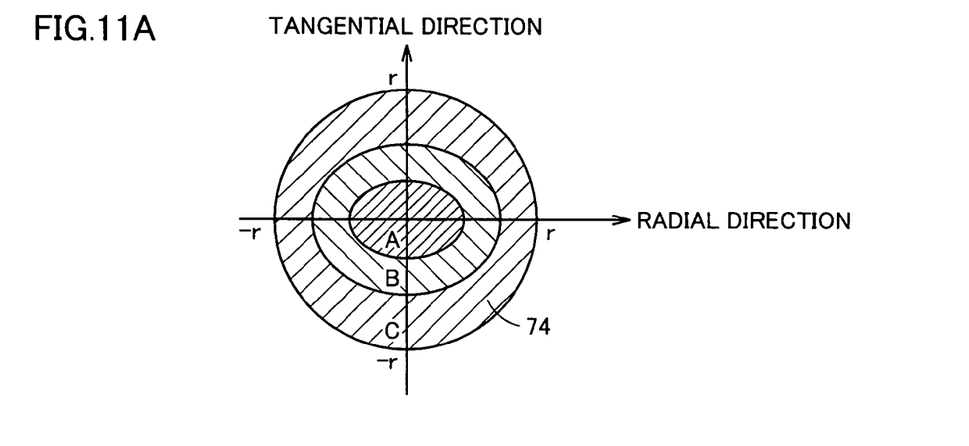
FIG. 11A shows areas A-C as seen in a direction perpendicular to the mirror surface.
Figure 11B:
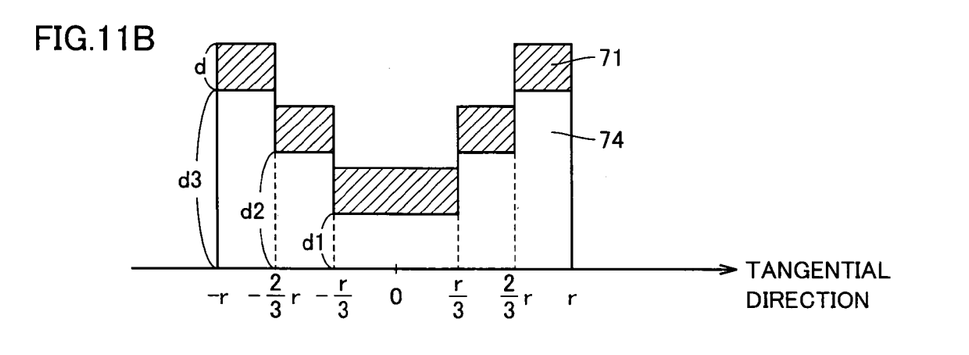
FIGS. 11B and 11C show variations in thickness of mirror 74 as seen in the tangential and radial directions, respectively.
Figure 11C:
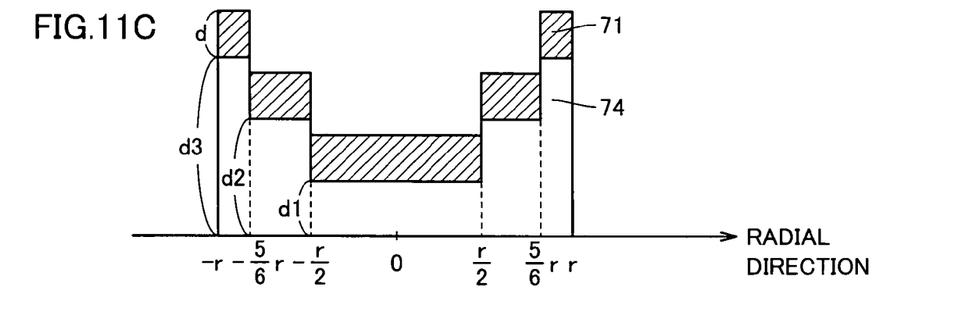

FIG. 11A shows areas A-C as seen in a direction perpendicular to the mirror surface. FIG. 11B and 11C illustrate how in the tangential and radial directions, respectively, mirror 74 varies in thickness.

As shown in the figures, mirror 74 at a thin portion has a ratio larger in the radial direction than the tangential direction. As such, mirror 74 more readily flexes in the radial direction, and its mirror surface can be deformed to have a radius of curvature in the tangential direction larger than that of curvature in the radial direction. A smaller amount of spherical aberration can be achieved than when radii of curvature in the tangential and radial directions are equal.

Thus the present embodiment provides an optical pickup device that includes turning/aberration correction mirror 74 having a thin portion with a ratio larger in the radial direction than the tangential direction to allow mirror 74 to have a mirror surface having a geometry with a radius of curvature in the tangential direction larger than that of curvature in the radial direction. A smaller amount of spherical aberration can be achieved that when radii of curvature in the tangential and radial directions are equal.

Fourth Embodiment

The present embodiment relates to an optical pickup device including a mirror actuator having a piezoelectric element uniform in thickness and elliptical as seen in cross section.

The present embodiment provides an optical pickup device distinguished from the first embodiment's optical pickup device shown in FIG. 1 by a mirror actuator 60 that is structured and operates, as will be described hereinafter.

Figure 12:
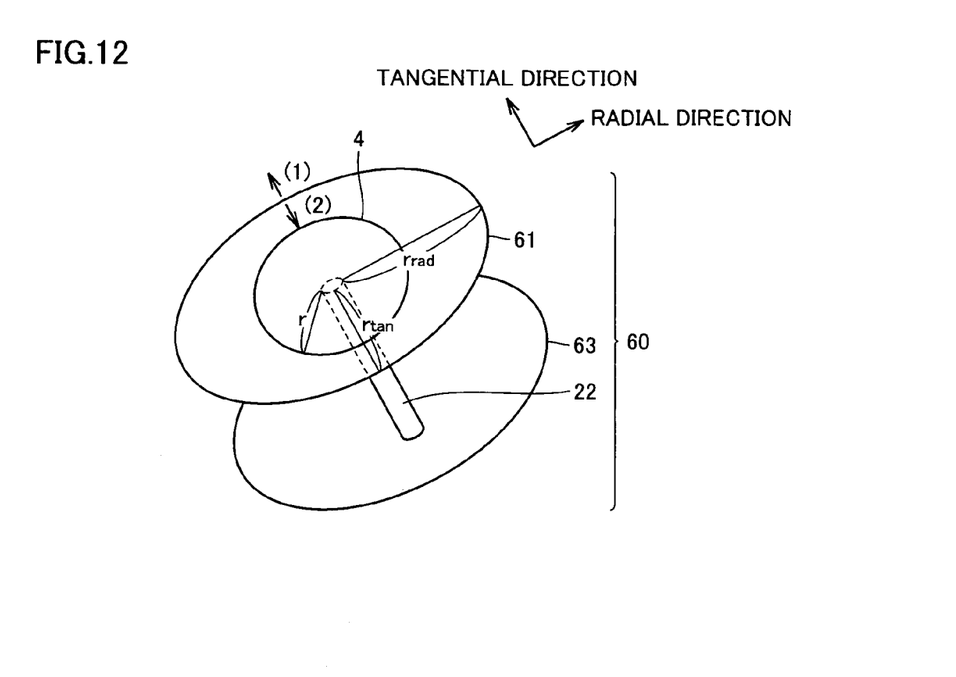
FIG. 12 shows a structure of a mirror actuator 60 and mirror 4.

FIG. 12 shows a structure of mirror actuator 60 and mirror 4 in the present embodiment. With reference to the figure, mirror actuator 60 includes a piezoelectric element 61, branch 22 supporting piezoelectric element 71, and a fixture 63.

Piezoelectric element 61 is bonded on a rear surface of mirror 4. The surface of piezoelectric element 61 that is bonded to mirror 74 is an ellipse, and the ellipse's center matches that of the rear, circular surface of the mirror. It should be noted, however, that the elliptical surface of piezoelectric element 61 is larger than the circular surface of mirror 4. Piezoelectric element 61 has a uniform thickness in a direction perpendicular to the mirror surface.

When piezoelectric element 61 has potential applied thereon, piezoelectric element 61 expands/contracts. More specifically, when piezoelectric element 61 receives positive potential, piezoelectric element 61 has the elliptical surface expanding radially around 360 degrees by a uniform ratio, as indicated in FIG. 12 by an arrow (1). As mirror 4 is bonded to piezoelectric element 61, mirror 4 flexes to concave, and the reflection of light 12 is thus converged.

In contrast, when piezoelectric element 61 receives negative potential, then as indicated in FIG. 12 by an arrow (2), piezoelectric element 61 has the elliptical surface contracting radially around 360 degrees by a uniform ratio. As mirror 4 is bonded to piezoelectric element 61, mirror 74 flexes to protrude, and the reflection of light 12 is thus diverged.

Figure 13:
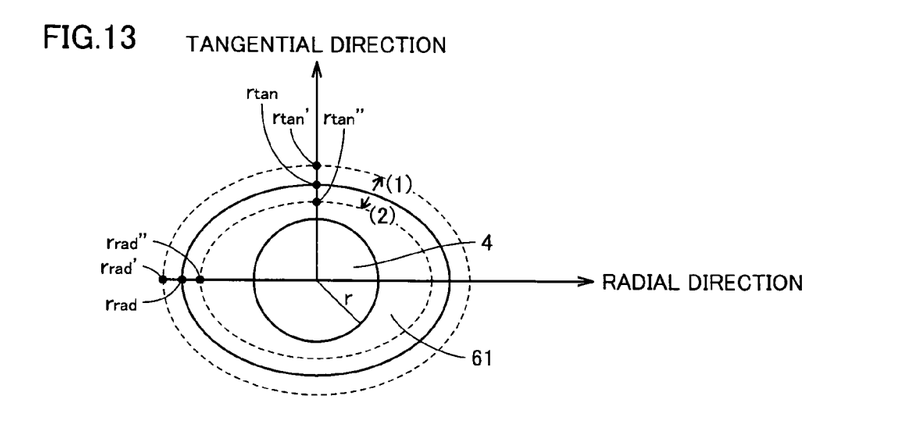
FIG. 13 shows a piezoelectric element 61 and mirror 4 in a direction perpendicular to the mirror surface.

FIG. 13 illustrates piezoelectric element 61 and mirror 4 as seen in a direction perpendicular to the mirror surface. As shown in the figure, mirror 4 is in the form of a circle whereas piezoelectric element 61 is in the form of an ellipse longer in the radial direction.

Piezoelectric element 61 in normal condition has a longer radius $r_{rad}$ and a shorter radius $r_{tan}$.

When a positive potential is applied, piezoelectric element 61 expands to have a longer radius $r_{tan}'(=k1 \times r_{tan})$ and a shorter radius $r_{rad}'(=k1 \times r_{rad})$, where k1>1.

More specifically, piezoelectric element 61 expands in the tangential direction by an amount It of $(k1-1) \times r_{tan}$ and in the radial direction by an amount 1 r of $(k1-1) \times r_{rad}$. As 1 r>1 t, piezoelectric element 61 expands to be larger in the radial direction than the tangential direction so that mirror 4 can flex greater in the radial direction, i.e., have a radius of curvature in the tangential direction larger than that of curvature in the radial direction. A smaller amount of spherical aberration can be provided than when radii of curvature in the tangential and radial directions are equal.

Furthermore when a negative potential is applied, the piezoelectric element contracts and thus has a longer radius $r_{tan}''(=k2 \times r_{tan})$ and a shorter radius $r_{rad}''(=k2 \times r_{r \, where \, k}2 < 1$.

More specifically, the piezoelectric element contracts in the tangential direction by amount It of $(1-k2) \times r_{tan}$ and in the radial direction by amount 1 r of $(1-k2) \times r_{rad}$. As 1 r>1 t, piezoelectric element 61 contracts to be smaller in the radial direction than the tangential direction so that mirror 4 can flex greater in the radial direction, i.e., have a radius of curvature in the tangential direction larger than that of curvature in the radial direction. A smaller amount of spherical aberration can be provided than when radii of curvature in the tangential and radial directions are equal.

Thus the present embodiment provides an optical pickup device including piezoelectric element 61 having an elliptical geometry with longer and shorter axes extending in radial and tangential directions, respectively, to allow turning/aberration correction mirror 4 to have a mirror surface deformed to have a radius of curvature in the tangential direction larger than that of curvature in the radial direction to provide an amount of spherical aberration smaller than when radii of curvature in the tangential and radial directions are equal.

Exemplary Variation

The present invention is not limited to the above described embodiments and also for example includes a variation described hereinafter.

Variation in Thickness of Piezoelectric Element

The present invention in the second and third embodiments provides a piezoelectric element varying in thickness in three steps, however the present invention is not limited thereto and the piezoelectric element may vary in thickness in four or more steps or gradually.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device allowing a laser beam of light emitted from a source of a laser beam of light to be reflected by a mirror to provide a reflection of light in turn focused by an objective lens on an optical storage medium, comprising: a circular mirror reflecting said laser beam of light; and a mirror actuator including a piezoelectric element having a thickness in a direction perpendicular to a surface of said mirror, and a circular surface bonded to a circular rear surface of said mirror such that a center of said circular surface of said piezoelectric element and that of said circular rear surface of said mirror match, said piezoelectric element receiving a potential to cause said circular surface bonded to said mirror to expand/contract radially around 360 degrees by a uniform ratio to allow said mirror to have a surface modified in geometry, said piezoelectric element being adjusted in thickness so that as said piezoelectric element expands/contracts, said piezoelectric element allows said mirror to have a surface with a ratio of a radius of curvature in a radial direction of said mirror to that of curvature in a tangential direction of said mirror of $(\cos(2\theta)+1)/2$, where $\theta$ represents an angle of incidence on said surface of said mirror.

2. An optical pickup device allowing a laser beam of light emitted from a source of a laser beam of light to be reflected by a mirror to provide a reflection of light in turn focused by an objective lens on an optical storage medium, comprising: a circular mirror reflecting said laser beam of light; and a mirror actuator including a piezoelectric element having a thickness in a direction perpendicular to a surface of said mirror, and a circular surface bonded to a circular rear surface of said mirror such that a center of said circular surface of said piezoelectric element and that of said circular rear surface of said mirror match, said piezoelectric element receiving a potential to cause said circular surface bonded to said mirror to expand/contract radially around 360 degrees by a uniform ratio to allow said mirror to have a surface modified in geometry, said piezoelectric element varying in thickness in a predetermined number of steps to be thinner toward a center thereof and thicker toward a perimeter thereof to have regions different in thickness each forming with an adjacent one of said regions a boundary in a form of an ellipse having longer and shorter axes in radial and tangential directions, respectively, as seen in a plane perpendicular to a centerline of said mirror.

3. An optical pickup device allowing a laser beam of light emitted from a source of a laser beam of light to be reflected by a mirror to provide a reflection of light in turn focused by an objective lens on an optical storage medium, comprising: a circular mirror having a thickness reflecting said laser beam of light; and a mirror actuator including a piezoelectric element having a circular surface bonded to a circular rear surface of said mirror such that a center of said circular surface of said piezoelectric element and that of said circular rear surface of said mirror match, said piezoelectric element receiving a potential to cause said circular surface bonded to said mirror to expand/contract radially around 360 degrees by a uniform ratio to allow said mirror to have a surface modified in geometry, said mirror varying in thickness in a predetermined number of steps to be thinner toward a center thereof and thicker toward a perimeter thereof to have regions different in thickness each forming with an adjacent one of said regions a boundary in a form of an ellipse having longer and shorter axes in radial and tangential directions, respectively, as seen in a plane perpendicular to a centerline of said mirror.

4. An optical pickup device allowing a laser beam of light emitted from a source of a laser beam of light to be reflected by a mirror to provide a reflection of light in turn focused by an objective lens on an optical storage medium, comprising: a circular mirror reflecting said laser beam of light; and a mirror actuator including a piezoelectric element having a uniform thickness in a direction perpendicular to a surface of said mirror, and an elliptical surface having longer and shorter axes in radial and tangential directions, respectively, and bonded to a circular rear surface of said mirror such that a center of said elliptical surface of said piezoelectric element and that of said circular rear surface of said mirror match, said piezoelectric element receiving a potential to cause said elliptical surface to expand/contract radially around 360 degrees by a uniform ratio to allow said mirror to have a surface modified in geometry.

\* \* \* \* \*